April 18, 1933. W. D. ARCHEA 1,904,641
MILLING MACHINE COLLET
Filed May 25, 1931

Inventor
WALTER D. ARCHEA
By AHParsons
Attorney

Patented Apr. 18, 1933

1,904,641

UNITED STATES PATENT OFFICE

WALTER D. ARCHEA, OF CINCINNATI, OHIO, ASSIGNOR TO THE CINCINNATI MILLING MACHINE COMPANY, OF CINCINNATI, OHIO, A CORPORATION OF OHIO

MILLING MACHINE COLLET

Application filed May 25, 1931. Serial No. 539,671.

This invention relates to milling machines and more particularly to improved means for securing a tool or cutter to the spindle thereof.

One of the principal objects of this invention is to provide an improved collet for quickly attaching or removing a cutter with respect to the spindle of a milling machine.

Another object of this invention is to provide an improved cutter collet for the spindle of a milling machine adapted to have an annular cutter secured thereto whereby an auxiliary cutter may be attached or removed without disturbing the annular cutter.

Other objects and advantages of the present invention should be readily apparent by reference to the following specification considered in conjunction with the acompanying drawing illustrative of one embodiment thereof, but it will be understood that any modifications may be made in the specific structural details hereinafter disclosed, within the scope of the appended claims, without departing from or exceeding the spirit of the invention.

Referring to the drawing in which like reference numerals indicate like parts:

In the milling of large work pieces of considerable weight it is the preferable production practice to perform as many operations in one set-up of the work as possible even if this necessitates a changing of tools as, due to the weight of the work, it is more economical to make a change of cutters than to change the work from one machine to another for each particular operation. In order to perform these operations in a minimum of time it, therefore, becomes necessary and desirable that the change of cutters be effected quickly and expeditiously.

Figure 3:
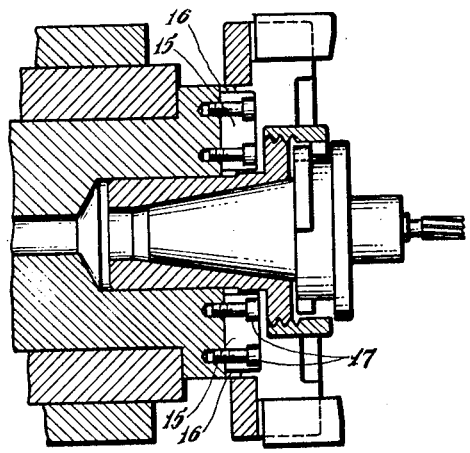
Figure 3 is a section on the line 3—3 of Figure 1.

This is accomplished in the present invention by providing a quick removable cutter collet comprising a body portion 10 which is adapted to be secured to the end of a cutter spindle 11 by suitable means, such as filister head screws 12. It will be noted that this body member is small enough in diameter to be attached directly to the end of the spindle nose and still permit the annular cutter 13, which surrounds it, to be also attached directly to the spindle nose as by means of screws or bolts 14. Since the cutters 13 are large in diameter a large turning moment is developed, and to prevent relative movement between the tool and the spindle, keys, such as 15, as shown in Figure 3, are secured in radial slots 16 formed in the end face of the spindle by a plurality of screws 17. These keys fit tightly in the slots 16 and project an equal amount beyond the end face of the spindle for engaging similar radial grooves formed in the rear face of the cutter. By means of this construction the driving torque is transmitted from the spindle to the cutter and the bolts 14 simply serve to maintain the cutter in contact with the end face of the spindle.

Figure 6:
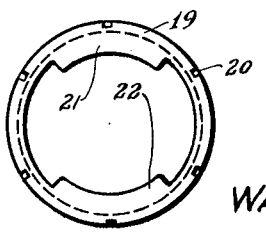
Figure 6 is a detail of an annular clamping ring.
Figure 7:
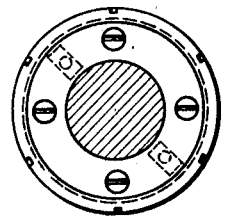
Figure 7 is an end view of the modification shown in Figure 4.

The cutter collet body 10 is also provided with similar radial grooves in its rear face for engaging the keys 15 to prevent relative angular movement between the member 10 and the spindle, there being practically no load transmitted through the securing bolts 12. A coarse pitched thread 18 is cut on the periphery of the member 10 for receiving an annular clamping ring 19. This ring has a plurality of grooves or notches 20 formed in its periphery by which it may be rotated by a suitable spanner wrench. The clamping ring 19, as shown more particularly in Figure 6, is provided with a pair of oppositely disposed inwardly extending segmental flanges or wings 21 and 22. These flanges or wings subtend an angle of substantially 90° and are for the purpose of securing the shank of a tool or tool adapter in the collet.

Figure 2:
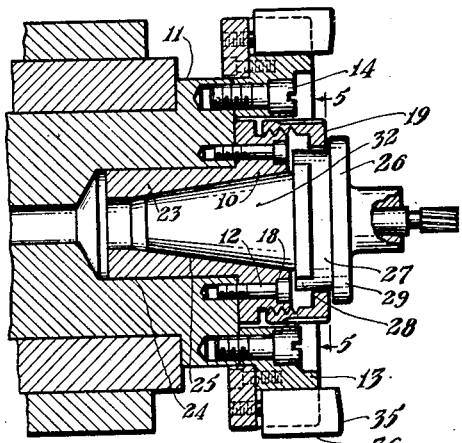
Figure 2 is a section on the line 2—2 of Figure 1.
Figure 1:
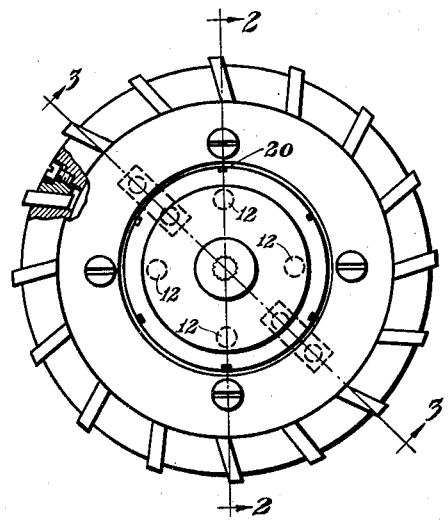
Figure 1 is an end view of a cutter collet representing one form of the invention.
Figure 5:
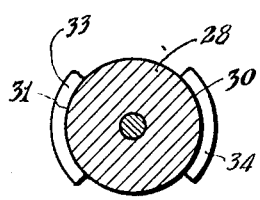
Figure 5 is a section on the line 5—5 of Figure 2.

As shown in Figures 2 and 3, the collet body 10 is provided with a reduced cylindrical portion 23 which is adapted to fit in a tubular bore 24 formed in the end of the spindle. A tapered bore 25 is formed in the member 10 for receiving the tapered end of a tool or tool adapter. The tools or adapters which are used in this invention are provided with a circular body portion 26 in which is formed an annular groove 27 forming a pair of flanges 28 and 29. The flange 28, as shown in Figure 5, has two cut-outs 30 and 31, each of which subtends an angle of substantially 90° and which are diametrically opposite to one another.

Upon assembly, the tool or adapter is angularly positioned and inserted into the socket 25 so that the flanges or ears 21 and 22 of the clamping ring 19 will pass through the cut-away portions 30 and 31. The ring 19 should be threaded on the body member 10 to such a position that the tapered shank 32 will fit in the socket 25 by hand pressure with just sufficient clearance to permit rotation of the ring 19 and thereby engagement of the ears 21 and 22 with the ears 33 and 34 of the tool. The spanner wrench may now be applied to the ring and the thread 18 is of sufficient pitch that a quarter rotation of the ring 19 should be sufficient to firmly clamp the tool in the collet.

It should be apparent from Figures 2 and 3 that the plane of the end face of the ring 19 is inside of the plane of the end cutting edges 35 of the cutting teeth 36. This makes it possible for the large cutter 13 to slab off or mill a large surface without interference from the collet after which an auxiliary cutter may be quickly attached without loss of time and a smaller surface finished during which time the speed of the spindle may be increased, due to the smaller size of the cutter and a more satisfactory finish obtained than if the two surfaces were cut at the same time.

Figure 4:
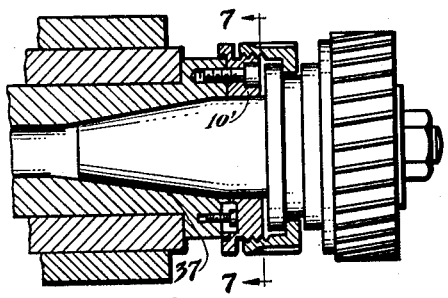
Figure 4 is a sectional view showing a modified form of the invention.

The invention is susceptible of application to spindles of smaller construction, as more particularly illustrated in Figure 4, in which case it is unnecessary to provide the collet body 10' with an elongated shank portion as the tapered bore 37, formed in the end of the spindle, may be utilized directly to receive the shank of the tool or tool adapter. This construction is more suitable for tool room work where cutters are changed frequently, due to the variety of work handled.

That which is claimed is:

1. In a spindle structure for a milling machine comprising a rotatable spindle, an annular cutter and standard keys for coupling the cutter to the spindle for rotation thereby, the combination of means for quickly detachably connecting a second cutter to the spindle for rotation thereby comprising an adapter, means to secure the adapter to the end face of the spindle in driving engagement with said keys and centrally of the annular cutter, and a locking member carried by the adapter having means thereon for inter-engaging similar means on a second cutter upon partial rotation of the member for securing the last named cutter to the spindle.

2. In a spindle structure for a milling machine comprising a rotatable spindle, an annular cutter and standard keys in the end face of the spindle for securing the cutter to the spindle for rotation thereby the combination of means for detachably connecting a second cutter to the spindle for simultaneous rotation therewith, said spindle having an axial depression formed in the end thereof, an adapter mounted in the depression and centralized thereby relative to the annular cutter, means on the adapter engaging said keys upon association with the spindle for rotation thereby, and means to secure a second cutter in the adapter comprising a locking ring threaded on the adapter, wing portions formed on the ring adapted to inter-engage similar portions formed on a second cutter, and means to effect rotation of the ring to clamp the parts in operative engagement.

3. In a spindle structure for a milling machine comprising a rotatable spindle, an annular cutter attached to the end face of the spindle having cutting teeth lying in a plane parallel to the end face of the spindle but spaced therefrom, and standard keys mounted in the end face of the spindle for connecting the cutter thereto for simultaneous rotation, the combination of means for connecting an additional cutter to the spindle for rotation thereby including an adapter, said spindle having an axial bore formed in the end face thereof for receiving said adapter and centralizing the same relative to the annular cutter, means on the adapter for engaging portions of said keys extending radially inward beyond the inner circumference of the annular cutter to lock the same with the spindle, a locking member carried by the adapter having portions engageable with similar portions formed on a second cutter for securing the last named cutter to the spindle, said locking member lying in spaced relation to the plane of the annular cutter teeth and adjacent the end of the spindle whereby the annular cutter may operate on plane surfaces without interference from the clamping ring upon removal of the second cutter.

4. In a collet structure for a machine tool spindle the combination of a tool holder adapted to be attached to the spindle, said holder having a flange formed thereon, a clamping member mounted on the flange, a tool member detachably connectible with the holder, cooperating wing portions formed on said members, said portions being peripherally spaced whereby the parts may be axially assembled, and means to effect relative rotation between said members to cause inter-engagement of the cooperating portions to lock the members for simultaneous movement.

5. In a collet structure for a machine tool spindle having an annular cutter attached thereto, the combination of a support member adapted to be attached to the spindle centrally of the cutter, a clamping ring threaded on the flange, a tool member detachably connectible with the holder, cooperating wing portions formed on said members, said portions being complementally spaced to permit axial assembly thereof, and means to effect a partial revolution of the clamping member to cause inter-engagement of the cooperating portions to lock the tool with the spindle.

6. In a device of the class described, the combination with a spindle, a cutter and a tool holder attachable to the spindle, of common means for keying the cutter and tool holder for rotation with the spindle, said tool holder having means for securing an additional tool to the spindle for rotation thereby including a clamping ring threaded on the holder, a tool insertable therein, a flange formed on the ring for engagement with a complementary flange formed on the tool, said flanges having interrupted portions to permit assembly of the tool with the holder, and means to rotate the ring to effect clamping inter-engagement of the flanges.

7. In a spindle structure for a milling machine comprising a rotatable spindle having a flanged end face, and standard keys attached to said face for driving annular cutters adapted to be mounted on the spindle, the combination of means for detachably connecting a tool adapter to the spindle for rotation by said keys, said spindle having an axial depression formed in the end thereof centrally of said keys, an adapter having key receiving slots formed therein mounted in said depression in operative engagement with said keys for rotation by the spindle, quick acting means for securing a cutter in the adapter comprising a locking ring threaded on the adapter, wing portions formed on the ring engageable with the similar wing portions formed on the cutter, and means to rotate the ring to clamp the parts in operative engagement.

In testimony whereof, I affix my signature.

WALTER D. ARCHEA.